F. W. BELLMAN.
CRIMPING TONGS.
APPLICATION FILED NOV. 7, 1917.
1,284,993.
Patented Nov. 19, 1918.
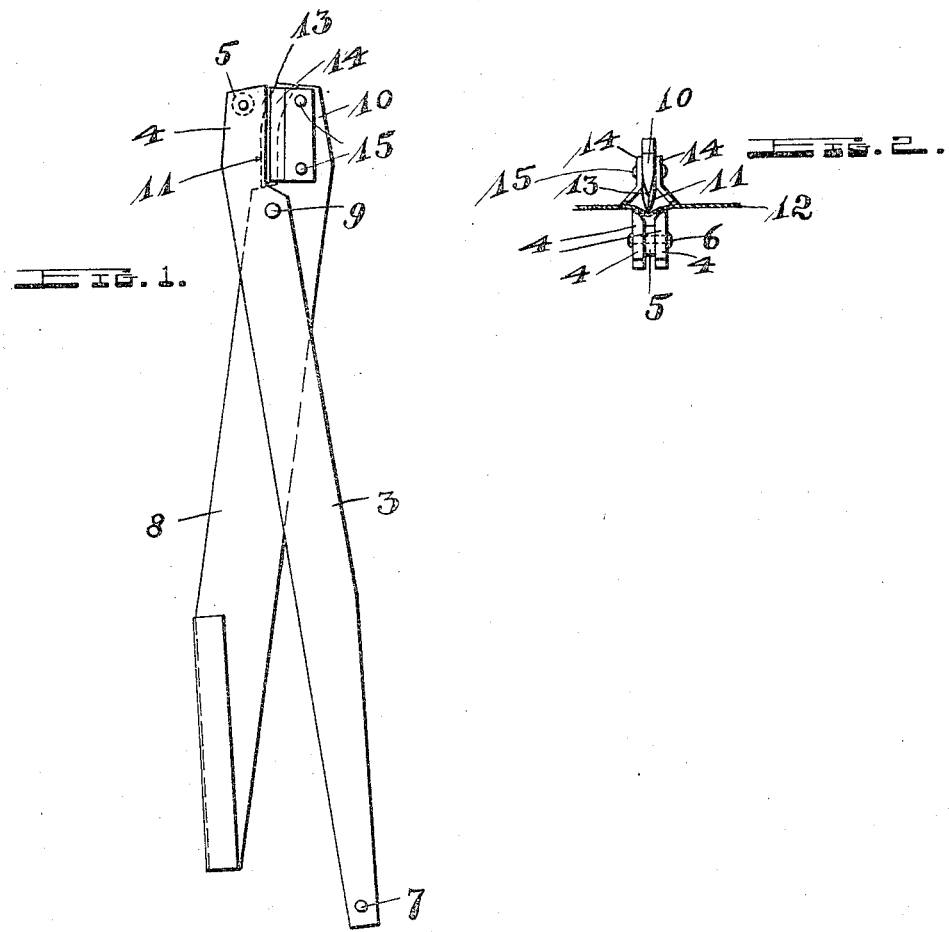
WITNESSES:
INVENTOR
Frank W. Bellman
BY
ATTORNEY

UNITED STATES PATENT OFFICE.

FRANK W. BELLMAN, OF LOS ANGELES, CALIFORNIA.

CRIMPING-TONGS.

1,284,993. Specification of Letters Patent. Patented Nov. 19, 1918.

Application filed November 7, 1917. Serial No. 200,762.

*To all whom it may concern:*

Be it known that I, FRANK W. BELLMAN, a citizen of the United States, residing at Los Angeles, in the county of Los Angeles and State of California, have invented a new and useful Crimping-Tongs, of which the following is a specification.

My invention relates to crimping tongs used for crimping the ends of a pipe to easily slip into the normal end of another pipe.

The main object of this invention is to provide a tool which can easily be handled on the job away from the work-shop insuring a smooth and tight joint in the pipe on which such tool is used.

Another object is provide a tool which allows the making of long lap joints in sheet metal pipe without distorting or changing the shape line of the pipe.

Another object is to provide a tool with a narrow lower crimping jaw which will allow the crimping of small pipes as well as pipes with a larger diameter with the same tool, the narrow lower crimping jaw being inserted into such pipes.

Another object is to provide a tool which allows its use on round pipes as well as on pipes of any other shape.

Another object is to provide a tool with which short lap joints can be made as well as long joints.

Another object is to provide a tool with which crimping of gradually decreasing depth can be made so as to form a smooth and tight joint in pipe joints.

Other objects will appear from the following description and appended claim as well as from the accompanying drawing, in which—

Figure 1 is a plan view of my device.

Fig. 2 is an end view of the two opposite crimping members.

Similar numbers refer to similar parts throughout the several views.

3 designates one handle terminating in the two lower jaws 4, spaced by the washer 5 and held together by the rivet 6, the handle 3 being illustrated as being made of two flat iron bars of which the free ends are held together by the rivet 7, but it will easily be understood that such handles can be made of malleable castings or other similar materials. The two flat iron bars comprising the handle 3 are suitably spaced to allow the inserting of the handle 8, which is also made of flat iron, the two handles being loosely held together by the rivet 9 for oscillating movement of the handles as well as of the jaw members 4 and 10. The jaw member 10 of the handle 8 is provided with a nearly sharp edge 11, which is disposed in the middle between the two lower jaws so as to cause sheet metal placed between the two jaws 4 and the sharp edged jaw 11 to bend or crimp as illustrated in Fig. 2, 12 designating a piece of metal. The edge 11 is rounded off and gradually less projecting between the opposite jaws 4 so that the termination 13 of the curved edge remains always a suitable distance away from the two jaws 4, this procuring a gradually decreasing depth in the crimping from the end of the pipe in to the full metal, causing a contraction of the end of a pipe gradually tapering up to the full smooth part of the pipe, as will easily be understood. The two guide plates 14 are secured to the jaw member 10 a suitable distance back from the edge 11 so that the edge 11 is allowed to press into the metal while the two jaws 4 oppose the two guide plates 14 with the metal between.

The construction illustrated is preferred though, as already stated, castings may be used instead, the spaced bars allowing the metal to enter without much friction, while opposing casted recesses would naturally cause more friction.

The crimping tongs constitute a pair of iron working members that provide for a movement one into the other for contracting the end of one sheet metal pipe to be telescoped into the uncontracted end of another pipe of equal diameter or girth. In the drawing is shown a double, open bar, but it will easily be understood that a single, slotted bar may be used instead, the two inner upper corners of the jaw part being rounded to minimize friction in operation, the slotted or open part being of a width to admit a single bar or blade for a counter or an opposing jaw to the double open end. The single bar or blade is provided with a tapered edge, being rounded off lengthwise, the tapered nearly sharp edge being straight for about two-thirds of its length then being rounded upward, gradually more spaced from the opposing jaws retaining its side-taper throughout to the extreme end, the purpose of which is to form a gradual upward turn in the crimp at the end and terminating into the uncrimped section of the pipe without distortion at that point. The grip end of the crimping bars are beveled or turned toward each other, the two outer lines of which forming a nearly parallel gripping surface when the tops or crimping ends are closed, thus coming within the range of the open hand, when the crimping jaws are open. The upper gripping end is made a suitable distance longer then the lower handle so that, when the lower handle is grasped by the four fingers, the grip end of the upper bar will extend a little beyond the palm of the hand, doing away with any pressure of the extreme end of the upper bar into the palm of the hand when the bars are being drawn together.

Having thus described my invention, I claim:

In a crimping tool of the class described a double-edged jaw, and a single-edged jaw opposing the double-edged jaw so as to project between the two edges of the double-edged jaw when crimping metal, the crimping edge of the single-edged jaw being in parallel position to the crimping edges of the double-edged jaw except for the front point of the single-edged jaw which is curved so as to be not between the two opposing jaw edges allowing an evenly deep crimp for a suitable length while the curved front point cannot distort the material, stopping plates provided near the single-edged jaw with the working edges a suitable distance back from the front of the single-edged jaw being also in parallel position to the several crimping edges when the tong is in compressed position.

In testimony whereof I have hereunto set my hand at Los Angeles, California, this 1st day of November, 1917.

FRANK W. BELLMAN.

In the presence of—
T. E. MERRILL,
OTTO H. KRUEGER.

Copies of this patent may be obtained for five cents each, by addressing the "Commissioner of Patents, Washington, D. C."